UNITED STATES PATENT OFFICE.

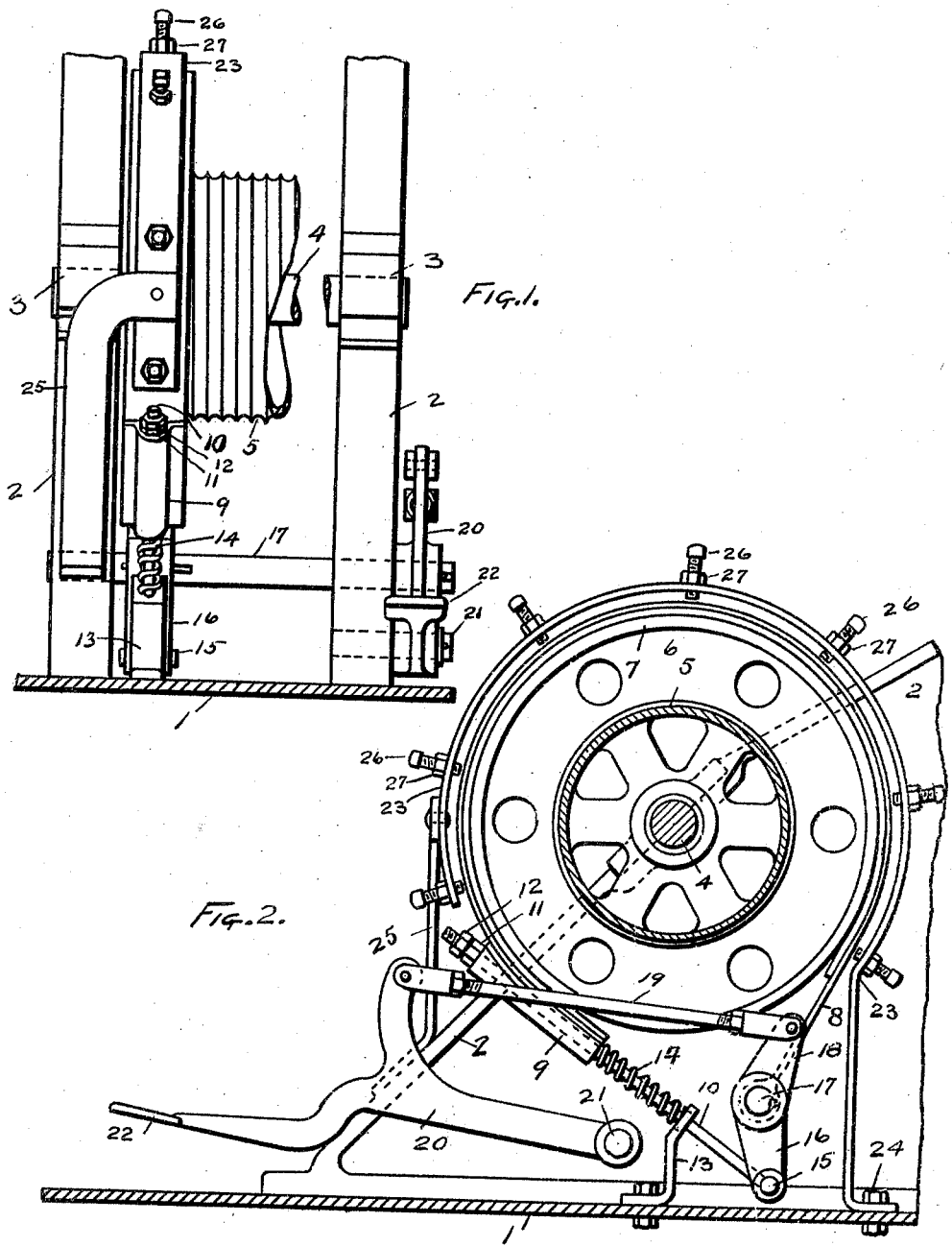

EDWIN J. ARMSTRONG, OF ERIE, PENNSYLVANIA, ASSIGNOR TO BALL ENGINE COMPANY, OF ERIE, PENNSYLVANIA, A CORPORATION OF PENNSYLVANIA.

DEVICE FOR BAND-BRAKES AND THE LIKE.

1,315,452.  
Specification of Letters Patent.  
Patented Sept. 9, 1919.

Application filed January 20, 1915, Serial No. 3,368. Renewed January 27, 1919. Serial No. 273,503.

*To all whom it may concern:*

Be it known that I, EDWIN J. ARMSTRONG, a citizen of the United States, residing at Erie, in the county of Erie and State of Pennsylvania, have invented new and useful Improvements in Devices for Band-Brakes and the like, of which the following is a specification.

This invention relates to devices for band brakes and the like and consists in certain improvements in the construction thereof as will be hereinafter fully described and pointed out in the claims.

As shown the invention is applied to a band brake of a hoisting drum. This is ordinarily operated by a foot lever and the range of movement of the foot lever is necessarily small. If the leverage is made such as to give great force to the brake the lost motion necessary to release the brake must be reduced to a minimum. This is accomplished in the present invention.

The invention is illustrated in the accompanying drawings as follows:—

Figure 1 shows a front view of a brake drum with the brake in position thereon.

Fig. 2 an end view, partly in section, of the part shown in Fig. 1.

1 marks the frame or base of the machine, 2 the posts carrying the bearings 3 for the drum shaft 4. The drum 5 is mounted on the drum shaft. The brake wheel 7 is arranged on one flange 6 of the drum. The brake band 8 extends around the brake wheel. It has one end anchored in any convenient manner. The other end is connected to the sleeve 9. A rod 10 extends through the sleeve and is provided with the adjusting nut 11 by means of which the length of the brake band may be properly adjusted. A jam nut 12 is provided for locking the adjusting nut 11 in adjustment. The rod 10 extends through a bracket 13 on the frame and the spring 14 is arranged around the rod and between the end of the sleeve 9 and the bracket 13. The spring tends to expand the brake band so as to release the brake.

The rod 10 is connected by a pin 15 with a rock arm 16. The rock arm 16 is fixed on a shaft 17. The shaft 17 extends through the posts 2 and is provided at its outer end with a rock arm 18. The rock arm 18 is connected by a link 19 with a foot lever 20. The foot lever 20 is pivoted on a pin 21 extending into one of the posts 2 and is provided with a pedal 22. The operator by depressing the foot lever 20 rocks the arm 18, shaft 17 and arm 16, thus tightening the brake band 8. When the foot lever is released, the spring 14 returns the foot lever and releases the brake band.

With brake bands as ordinarily used in these constructions the expansion of the band when released is not uniform, that is to say, it does not take the form of a true circle. As a result it is necessary to expand the brake band sufficiently to assure the disengagement of the band from all parts of the brake wheel. This involves a great deal of lost motion. To obviate this, I have provided the following mechanism:—

A controlling or guide band 23 is arranged around the brake band. One end is secured on the frame 1 by means of a bolt 24. The opposite end is supported by a bracket 25 extending from one of the posts 2. This controlling band or guide approximates a true circle in that portion which surrounds the brake band. At a number of points along the guide band 23 screws 26 are screwed into perforations in the guide band. These screws form stops against which the brake band expands. The screws may be locked in adjustment by the jam nuts 27. It will be readily seen that by adjusting the screws 26 so as to allow the expansion of the brake band just a sufficient distance to clear the brake wheel a very slight expansion of the brake band will assure the clearing of the brake band throughout its length.

While I have shown this invention as specifically adapted to a band brake it will be observed that it is applicable to any device having members one of which may rotate relatively to the other and in which it is desired to lock the members in engagement and to release them from such engagement.

What I claim as new is:—

1. In a band brake, the combination of a brake wheel; a flexible brake band on the wheel; a spring operating on the end of the brake band for releasing the band; means for setting the band; and devices arranged at intervals along the greater portion of the band controlling the shape of the band when released.

2. In combination a wheel; a band operating on the wheel; means operating on the end of the band for expanding the band to release it from the wheel and for contracting the band for bringing it into engagement with the wheel; and devices arranged at intervals along the greater part of the band controlling the shape of the band when expanded whereby the clearance between the band when expanded and the wheel may be controlled.

In testimony whereof I have hereunto set my hand in the presence of two subscribing witnesses.

EDWIN J. ARMSTRONG.

Witnesses:
V. C. HESS,
B. M. HARTMAN.

Copies of this patent may be obtained for five cents each, by addressing the "Commissioner of Patents, Washington, D. C."